(12) United States Patent
Thomas et al.

(10) Patent No.: US 6,249,438 B1
(45) Date of Patent: *Jun. 19, 2001

(54) ELECTRICAL DEVICE HAVING A PLUG OUTLET

(75) Inventors: Gerhard Thomas, Fuerth; Karl Wutz, Sengenthal; Ehrenfried Fabry, Hersbruck, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/143,623

(22) Filed: Aug. 28, 1998

(30) Foreign Application Priority Data

Sep. 11, 1997 (DE) .............................................. 297 16 304

(51) Int. Cl.⁷ ...................................................... H05K 7/20
(52) U.S. Cl. ........................... 361/752; 361/707; 361/715; 361/730; 439/748
(58) Field of Search .................................... 361/752, 761, 361/796, 785, 600, 679, 704, 707, 715, 719–721, 728, 730, 732, 736, 756, 759; 439/748, 752, 74, 79, 485, 487

(56) References Cited

U.S. PATENT DOCUMENTS

| | | | |
|---|---|---|---|
| 5,253,143 | * 10/1993 | Klinger et al. | 361/736 |
| 5,709,557 | * 1/1998 | Martin et al. | 439/79 |
| 5,842,892 | * 12/1998 | Heimueller et al. | 439/752 |
| 5,978,226 | * 11/1999 | Thomas et al. | 361/707 |

FOREIGN PATENT DOCUMENTS 33 10 477  1/1984 (DE) .

* cited by examiner

Primary Examiner—Leo P. Picard
Assistant Examiner—Hung Van Duong
(74) Attorney, Agent, or Firm—Kenyon & Kenyon

(57) ABSTRACT

An electrical device, and in particular a switching and controlling device for motor vehicles, has a housing, a printed circuit board arranged in the housing and fitted with electrical components, and, passing through a housing wall, a plug-and-socket connector which has a first part, connected to the printed circuit board and a second part, parallel to a printed-circuit-board surface and capable of fitting together with the first part. The first and second part of the plug-and-socket connector are arranged over the printed-circuit-board surface.

15 Claims, 2 Drawing Sheets

ELECTRICAL DEVICE HAVING A PLUG OUTLET

FIELD OF THE INVENTION

The present invention relates to an electrical device, in particular to a switching and controlling device for motor vehicles.

BACKGROUND INFORMATION

A conventional electrical device is described in German Patent Application No. 33 10 477. To conductively connect components and electrical circuits on the printed circuit board arranged inside the device to electrical devices outside the device, a plug-and-socket connector penetrating the front housing wall is arranged on the front side of the housing. The plug-and-socket connector has a first plug part (i.e., male connector), whose flat connector tabs are conductively connected to the printed circuit board. A second part of the plug-and-socket connector has individual sockets, which fit with the flat connector tabs. To connect the device in an electrically conductive manner to other devices, the second part of the plug-and-socket connector is brought from in front toward the front housing wall and is fitted together with the plug body. The plug-and-socket connector, including plug part and socket part, is arranged in its entirety on the front side of the housing. As a result of this, in assembling the electrical device, in addition to the housing dimensions, the dimensions of the plug-and-socket connector, which projects out at the front side of the housing wall, must be taken into account. Since the plug-and-socket connector is arranged on the front side of the printed circuit board, the space requirements in the longitudinal direction of the printed-circuit-board surface are great.

An object of the present invention is to refine an electrical device of the type described above such that plug-and-socket connectors are arranged on the electrical device in a space-saving manner.

SUMMARY OF THE INVENTION

According to the present invention, by arranging the complete plug-and-socket connector above a printed-circuit-board surface, the air space saved above the printed circuit board, for example, through the use of a SMD (i.e., a surface mounted device) technology can be used for the arrangement of the plug-and-socket connector. However, since the plug-and-socket connector at the same time penetrates the housing wall for the external connection of the electrical device, it follows that an area of the housing wall is arranged between one part of the plug-and-socket connector and the surface of the printed circuit board. In connection with the use of the SMD components, the plug-and-socket connector can be arranged either above a printed-circuit-board surface fitted with these components or above a printed-circuit-board surface furnished exclusively with printed circuit traces.

One of the advantages of the present invention is that the plug-and-socket connector, which ends up being relatively large in its dimensions, does not project over the printed circuit board on the front side and thus, in the context of predetermined printed circuit board dimensions, does not unnecessarily increase the space requirements of the electrical device in the direction of the printed-circuit-board surface. In its place, the otherwise unused space above the printed circuit board is used for arranging cables and plug-and-socket connectors.

In a further advantageous embodiment of the present invention, the first part of the plug-and-socket connector, connected to the printed circuit board, is arranged in the area of a front side of the printed circuit board, and the second part, above the printed-circuit-board surface, can be fitted together with the first part of the plug-and-socket connector from the side opposite the front side. In contrast to the conventional electrical devices, the first part of the plug-and-socket connector is soldered above the printed-circuit-board surface such that the plug direction is reversed. In this context, the second part, which has mostly sockets, is not plugged into the first part of the plug-and-socket connector from the front, with reference to the front side of the printed circuit board, but from the rear side. The front side of the printed circuit board, according to the present invention, is situated on the side from which the printed circuit board can be inserted into the housing. In this context, the plug-and-socket connector, which generally is made up of a plug and socket unit, does not project out over the front side of the printed circuit board. As a result of the reversed arrangement of the plug-and-socket connector, the plug-and-socket connector being thus fittable together in the reverse direction, on the one hand, the air space above the printed-circuit-board surface can be used to advantage and, on the other hand, in inserting the printed circuit board into the housing from the front side, the first part of the plug-and-socket connector can be passed through a housing wall and fitted together with the second part. In addition, soldering contacts of the first part of the plug-and-socket connector, for example those of a multipoint connector, are arranged advantageously at the front side of the housing and thus are easily accessible.

In another advantageous embodiment of the present invention, two separate printed circuit boards, or one of twice the size, having, in each case, at least one plug-and-socket connector, with their front sides arranged in relation to each other such that in each case the first parts of the plug-and-socket connector are facing away from each other. It is preferable that, in each case, the two first parts of the plug-and-socket connector, opposite each other, are attached to each other at their rear sides. In this way, a rigid bond is achieved between the plug-and-socket connectors. The plug-and-socket connectors are connected, in an electrically conductive manner, to the separate, or twice as large, printed circuit boards by soldering, so that as a result the printed circuit boards are also attached to each other. It is preferable that the unit made up of the two separate printed circuit boards, or the twice-as-large printed circuit board, having, in each case, plug-and-socket connectors exiting in two directions, can be inserted into two housing parts. Both housing parts, in this context, accommodate one plug-and-socket connector each and are joined to each other.

A housing or a housing part preferably has an area accommodating the printed circuit board and an area for accommodating the plug-and-socket connector, projecting laterally in the direction of the printed-circuit-board surface. The projecting area of the housing has at least one opening permitting the plug-and-socket connector to pass through the housing wall. The first part of the plug-and-socket connector passes through this opening. In addition, the first part of the plug-and-socket connector can have a seal, which can be pressed against the inner side of the housing wall around the opening, to seal off the housing against environmental influences. By clamping the plug between two housing halves, identically designed, or a housing having a cover, one additional plug mounting can be spared.

In another embodiment of the present invention, the opening in, the housing wall is arranged at a rear wall of the projecting area of the housing, situated opposite the front side of the printed circuit board. In connection with a first part of the plug-and-socket connector, arranged close to the front side of a printed circuit board, the printed circuit board can then be inserted from the front side into the housing, and the first part of the plug-and-socket connector, in this context, passes through the opening in the housing wall, disposed on the rear side near the front side.

On the outer side of the housing, opposite the opening in the projecting area, a cable mounting is preferable arranged. In this way, both parts of the plug-and-socket connector can be clamped between the cable mounting and housing, so that a supplemental plug mounting can be dispensed with.

Outside the housing, above the second part of the plug-and-socket connector, on the rear side of the laterally projecting area, a cover can be provided as well. This cover can additionally cover the cable mounting. The cover protects the cable mounting and plug-and-socket connector from contamination and prevents humidity from entering into the housing.

In place of a second housing part, a cover can also be provided on the front side of the housing, to secure the plug-and-socket connector and the printed circuit board by clamping, and to sealingly close off the housing on the front side.

DETAILED DESCRIPTION

Figure 1:
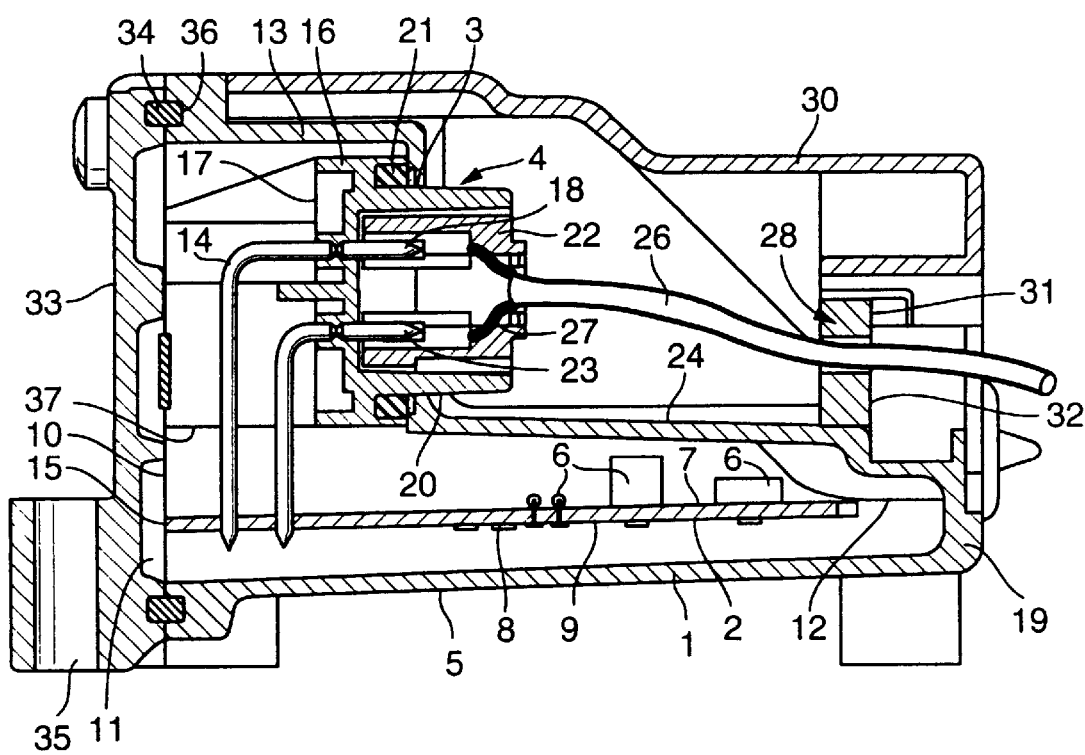
FIG. 1 shows a longitudinal section of a first exemplary embodiment of a device according to the present invention having a printed circuit board and a plug-and-socket connector.

The switching and controlling device according to the present invention, in accordance with the first exemplary embodiment, has a housing 1, in which a printed circuit board 2 and a plug part 3 of a plug-and-socket connector 4 are arranged.

Housing 1 has an area 5, extending in the longitudinal section, for accommodating printed circuit board 2. Area 5 is large enough to accommodate printed circuit board 2, having components 6, which can be SMD components, soldered onto a printed-circuit-board surface 7, and SMD components 8, on a printed-circuit-board surface 9 situated opposite. In the direction parallel to printed-circuit-board surfaces 7, 9, housing 1 has, on a front side 10, an opening 11 for inserting printed circuit board 2 into extended area 5 of housing 1. In extended area 5, guide elements 12 are arranged which enable printed circuit board 2 to be inserted into housing 1 and make possible the designated position of printed circuit board 2.

An area 13 of housing 1, projecting laterally in the direction of printed-circuit-board surfaces 7, 9, for accommodating plug part 3 of plug-and-socket connector 4 is arranged near front side 10 of housing 1. Plug part 3 of plug-and-socket connector 4 is soldered via contact pins 14 near front side 15 of printed circuit board 2. In this way, plug part 3 is connected to printed circuit board 2 adjacent to front side 10 of housing 1. Plug body 16 is aligned, with its rear side 17, with front side 10 of housing 1, so that plug contacts 18 are parallel to printed-circuit-board surface 7 and point to rear side 19 of the housing.

In laterally projecting area 13, housing 1 has an opening 20, through which plug part 3 projects towards the rear out of housing 1. At plug body 16 and at the housing wall disposed around opening 20, a seal 21 is situated, to seal housing 1 off from environmental influences and contamination. A second part 22 of plug-and-socket connector 4, having sockets 23, can be fitted together with the plug part 3 from rear side 19 of housing 1. Plug-and-socket connector 4 is arranged over printed-circuit-board surface 7 above components 6. Between second part 22 of the plug-and-socket connector and printed circuit board 2, a housing wall 24 running parallel to printed circuit board 2 is arranged.

A connecting cable 26 having individual conductors 27 is connected, in an electrically conductive manner, to second part 22 of plug-and-socket connector 4. Connecting cable 26 is clamped at a cable mounting 28 arranged above rear side 19 of housing 1 and thus provides strain relief for plug-and-socket connector 4.

A plastic cover 30 is arranged above extended area 5 of housing 1 over second part 22 of plug-and-socket connector 4 and connecting cable 26. Plastic cover 30 has one part of cable mounting 28 in the form of a semicircular shell 31, which cooperates with a second semicircular shell 32, which is secured outside on housing 1.

Front side 10 of housing 1, through which printed circuit board 2 can be inserted into housing 1, can be covered by a housing cover 33. This housing cover 33 has a seal 34 arranged in grooves 36 and a mounting means 35 for housing 1.

The assembly of housing 1 takes place as follows: Printed circuit board 2 fitted with components 6 and SMD components 8 having plug body 16 arranged over a printed-circuit-board surface 7, is inserted from front side 10 through opening 11 into housing 1. In this context, printed circuit board 2 is guided laterally by guide elements 12 in extended area 5 of housing 1, and plug part 3 of plug-and-socket connector 4, due to the rigid connection to printed circuit board 2, passes, when inserted into the laterally projecting area 13 of housing 1, through opening 20 disposed at the rear side and abuts there against the housing wall. As a result of the reversed plug direction of plug-and-socket connector 4 in regard to printed circuit board 2, plug-and-socket connector 4 is situated over the space of printed-circuit-board surface 7. From rear side 19 of housing 1, a second part 22 of plug-and-socket connector 4 having sockets 23 is plugged into plug part 3 and thus the electrical contact is created between components 6, 8 of printed circuit board 2 and electrical devices arranged outside of housing 1. In placing a plastic cover 30 on the top side of housing 1, a cable mounting 28 contacts connecting cable 26 in a clamping manner, so that strain relief results. Finally, a housing cover 33 for covering opening 11 is secured at front side 10 of housing 1 and thus solidly clamps printed circuit board 2 and plug-and-socket connector 4 in housing 1 via a spacing means 37.

Figure 2:
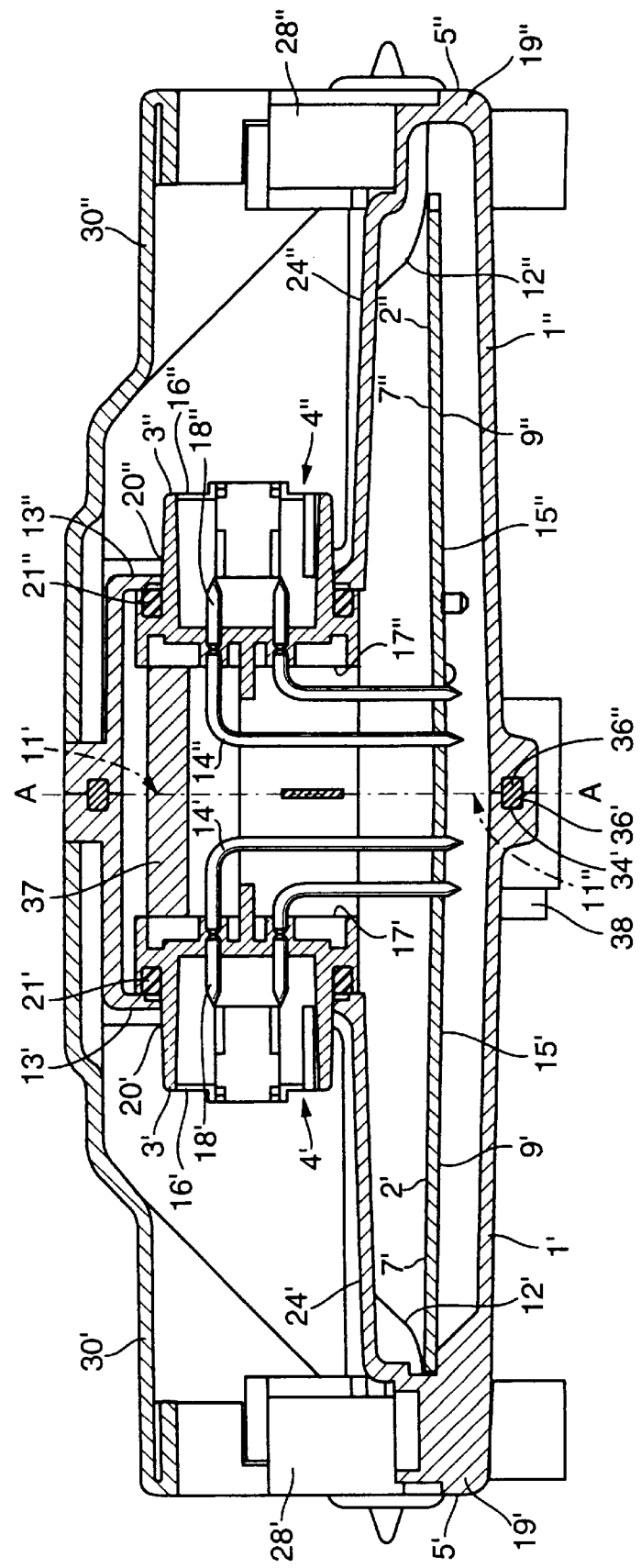
FIG. 2 shows a longitudinal section of a second exemplary embodiment of a device according to the present invention having two printed circuit boards and two plug-and-socket connectors.

In FIG. 2, a switching and controlling device for motor vehicles is depicted which essentially has two asymmetrically devices joined along axis A—A in accordance with the first exemplary embodiment. A printed circuit board 2', having a plug-and-socket connector 4' associated therewith, is connected at front side 15' to a second printed circuit board 2", having a plug-and-socket connector 4" associated therewith, at its front side 15". Spacing means 37 is arranged at the rear side of both plug bodies 16', 16" and acts as a spacer, fixing both plug bodies 16', 16" in their position above printed circuit boards 2', 2". Spacing means 37 is adjusted so that when housing 1' and 1" is screwed together using a screw 38 via plug parts 3' and 3", laterally projecting area 13' and 13" are sealed as a result of seals 21' and 21". The unit made up of two printed circuit boards 2' and 2", having their plug-and-socket connectors 4', 4", which are facing away from each other and parallel to printed-circuit-board surfaces 7', 7", is installed into housing 1', 1". For this purpose, housing 1' can be slid from rear side 19' over printed circuit board 2' and plug-and-socket connector 4', and a second housing 1" can be slid from the opposite side over printed circuit board 2", so that both housings 1' and 1", having their openings 11' and 11", abut against each other. A seal 34' is inserted between two housings 1', 1", at the abutting housing wall parts in grooves 36', 36".

The electrical device according to the second exemplary embodiment has, arranged over printed-circuit-board surfaces 7', 7", at least two plug-and-socket connectors 4', 4", whose undepicted second part, having the connecting cable is led out of housing 1', 1" at rear side 19', 19" situated opposite. In this context, a plurality of plug-and-socket connectors can be arranged next to or over each other in the housing halves 1', 1" designed to be particularly identical.

As a result of the reversed plug direction, plug-and-socket connectors 4', 4" are entirely arranged, in each case, above a printed-circuit-board surface 7', 7" and do not project in the direction of printed-circuit-board surfaces 7', 7" over printed circuit boards 2', 2".

What is claimed is:

1. An electrical device, comprising:
   a housing having a wall;
   at least one printed circuit board having a surface, arranged in the housing and accommodating electrical components; and
   at least one plug-and-socket connector for passing through the wall of the housing, each of the at least one plug-and-socket connector including:
      a first part coupled to the at least one printed circuit board, and
      a second part arranged parallel to the surface of the at least one printed circuit board, the second part fitting together with the first part,
   wherein the first and second parts of the at least one plug-and-socket connector are arranged above the surface of the at least one printed circuit board.

2. The electrical device according to claim 1,
   wherein the first part is arranged at a front side of the at least one printed circuit board, and
   wherein the second part conforms with the first part above the surface of the at least one printed circuit board from a rear side of the at least one printed circuit board, the rear side being opposite to the front side.

3. The electrical device according to claim 1,
   wherein the at least one printed circuit board includes two circuit boards, each of the two circuit boards including the at least one plug-and-socket connector and a respective front side facing another front side of another one of the two circuit boards, and
   wherein the at least one plug-and-socket connector includes at least two plug-and-socket connectors, the first part of each of the at least two plug-and-socket connectors facing away from the first part of another one of the at least two plug-and-socket connectors.

4. The electrical device according to claim 1, wherein the housing includes:
   at least one first area accomodating the at least one printed circuit board, and
   at least one second area laterally projecting in a direction of the surface of the at least one printed circuit board for accommodating the at least one plug-and-socket connector, the at least one second area having at least one opening enabling the at least one plug-and-socket connector to pass through the wall of the housing.

5. The electrical device according to claim 1, further comprising:
   a cover situated above the second part of the at least one plug-and-socket connector, the cover extending outside the housing.

6. The electrical device according to claim 1,
   wherein the at least one plug-and-socket connector includes two connectors, and the housing includes two housing portions,
   wherein the at least one printed circuit board includes the two connectors situated on the surface of the at least one printed circuit board, and
   wherein each of the two connectors includes a back portion, the back portion of one of the two connectors facing the back portion of another one of the two connectors inside the two housing portions.

7. The electrical device according to claim 1, further comprising:
   a housing cover for closing the housing on front and open sides of the housing.

8. The electrical device according to claim 1, wherein the electrical device includes a switching and controlling device for a motor vehicle.

9. The electrical device according to claim 2, wherein the at least one printed circuit board includes the first part of the at least one plug-and-socket connector and is insertable from the front side into the housing, the first part being insertable through an opening in the wall of the housing proximate to the front side. for a motor vehicle.

10. The electrical device according to claim 3, wherein the first part of one of the at least two plug-and-socket connectors is situated opposite to and secured to the first part of another one of the at least two plug-and-socket connectors via a rear side of each of the at least two plug-and-socket connectors.

11. The electrical device according to claim 3, wherein the housing includes a first housing portion and a second housing portion, the first housing portion accommodating a first circuit board of the two printed circuit boards having a first connector of the at least two plug-and-socket connectors, the second housing portion accommodating a second circuit board of the two printed circuit boards having a second connector of the at least two plug-and-socket connectors, each of the first and second housing portions being connectable to another one of the first and second housing portions.

12. The electrical device according to claim 4, wherein the at least one opening is situated at a rear wall of the at least one second area, the rear wall situated opposite to the at least one opening of the housing.

13. The electrical device according to claim 4, further comprising:
   a cable mounting arranged at an outer side of the housing and opposite to the at least one opening in the at least one second area.

14. The electrical device according to claim 11, wherein one of the first and second circuit boards is one of rigidly coupled and flexibly coupled to another one of the first and second circuit boards.

15. The electrical device according to claim 7, further comprising:
   a spacing arrangement for abutting against the housing cover, the spacing arrangement being secured at the at least one plug-and-socket connector for sealingly pressing the at least one plug-and-socket connector and a seal of the at least one plug-and-socket connector against an inner wall of the housing at an opening of the housing.

* * * * *

UNITED STATES PATENT AND TRADEMARK OFFICE
CERTIFICATE OF CORRECTION

PATENT NO. : 6,249,438 B1
DATED : June 19, 2001
INVENTOR(S) : Thomas, Gerhard et al.

It is certified that error appears in the above-identified patent and that said Letters Patent is hereby corrected as shown below:

Column 2,
Line 67, change "in," to -- in --

Column 6,
Line 37, delete "for a motor vehicle"

Signed and Sealed this

Fifteenth Day of October, 2002

Attest:

Attesting Officer

JAMES E. ROGAN
Director of the United States Patent and Trademark Office